Patented Aug. 25, 1936

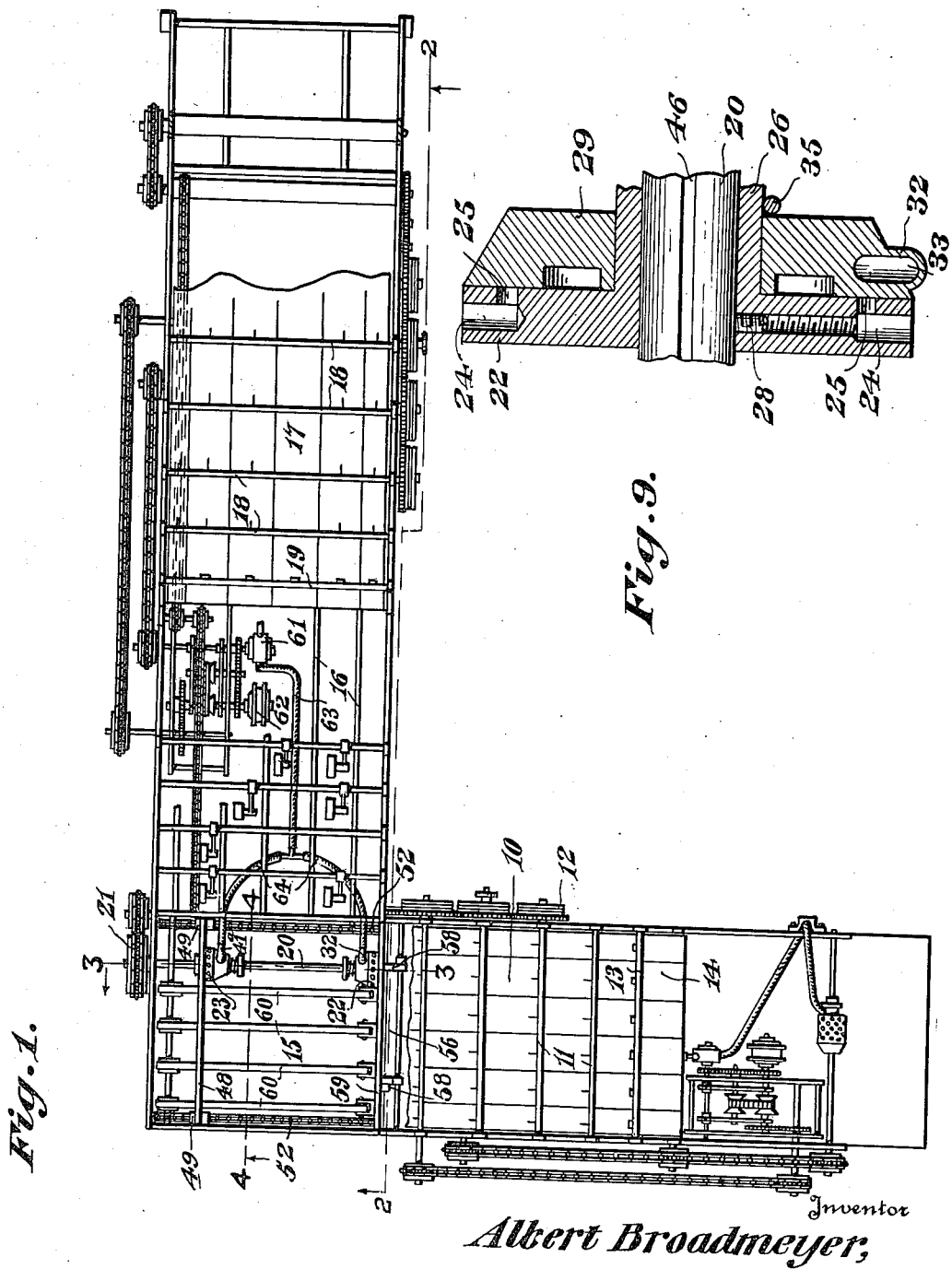

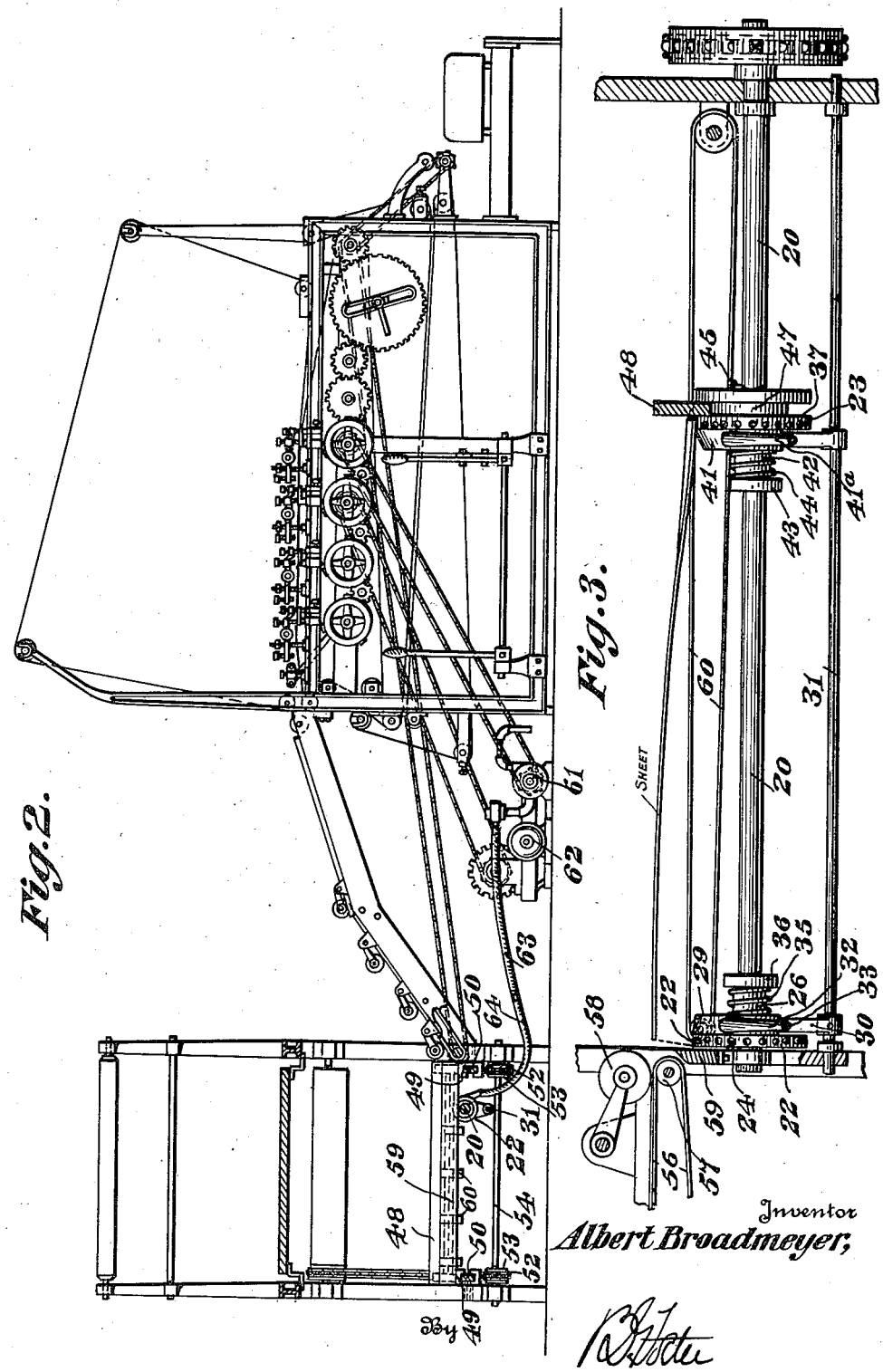

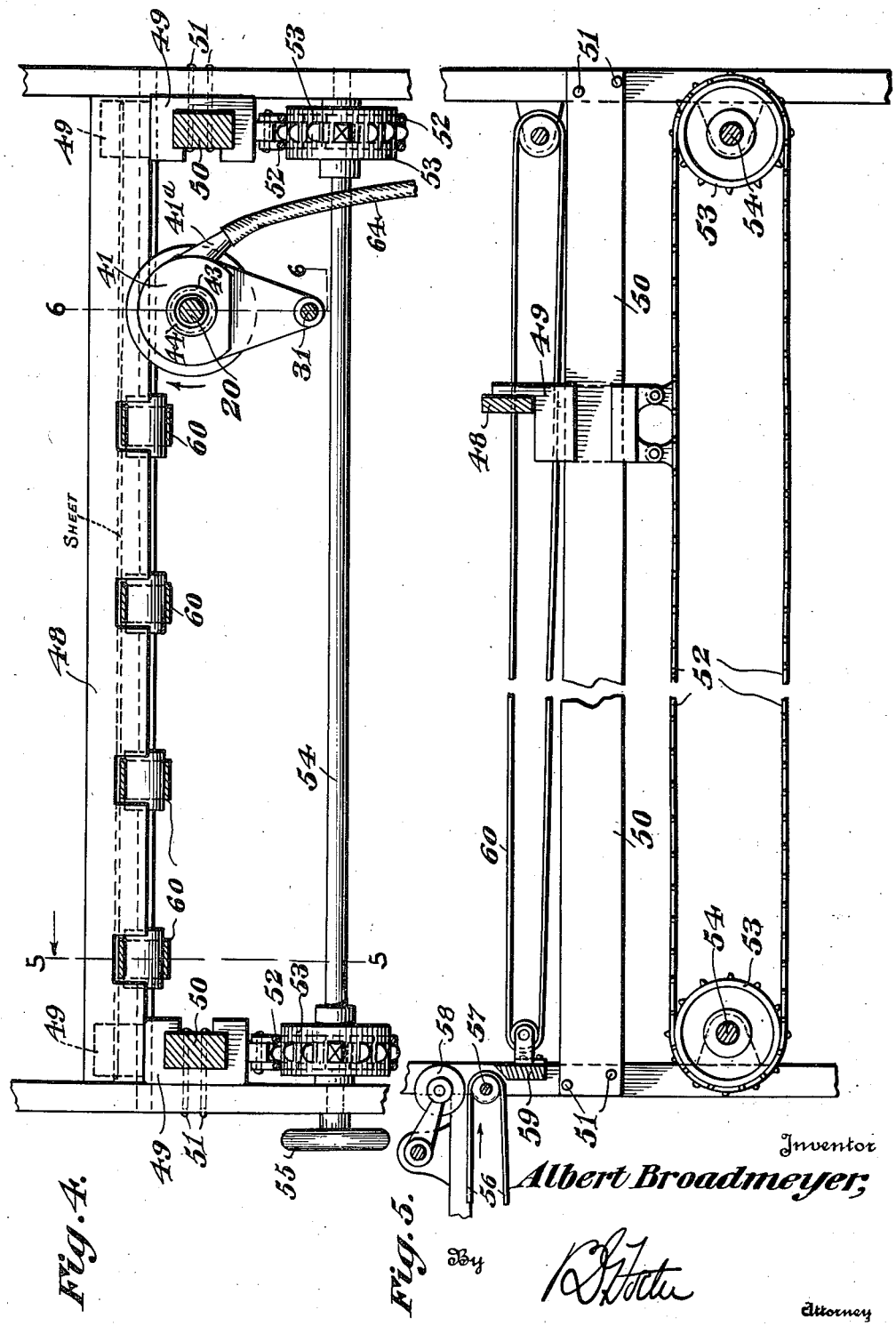

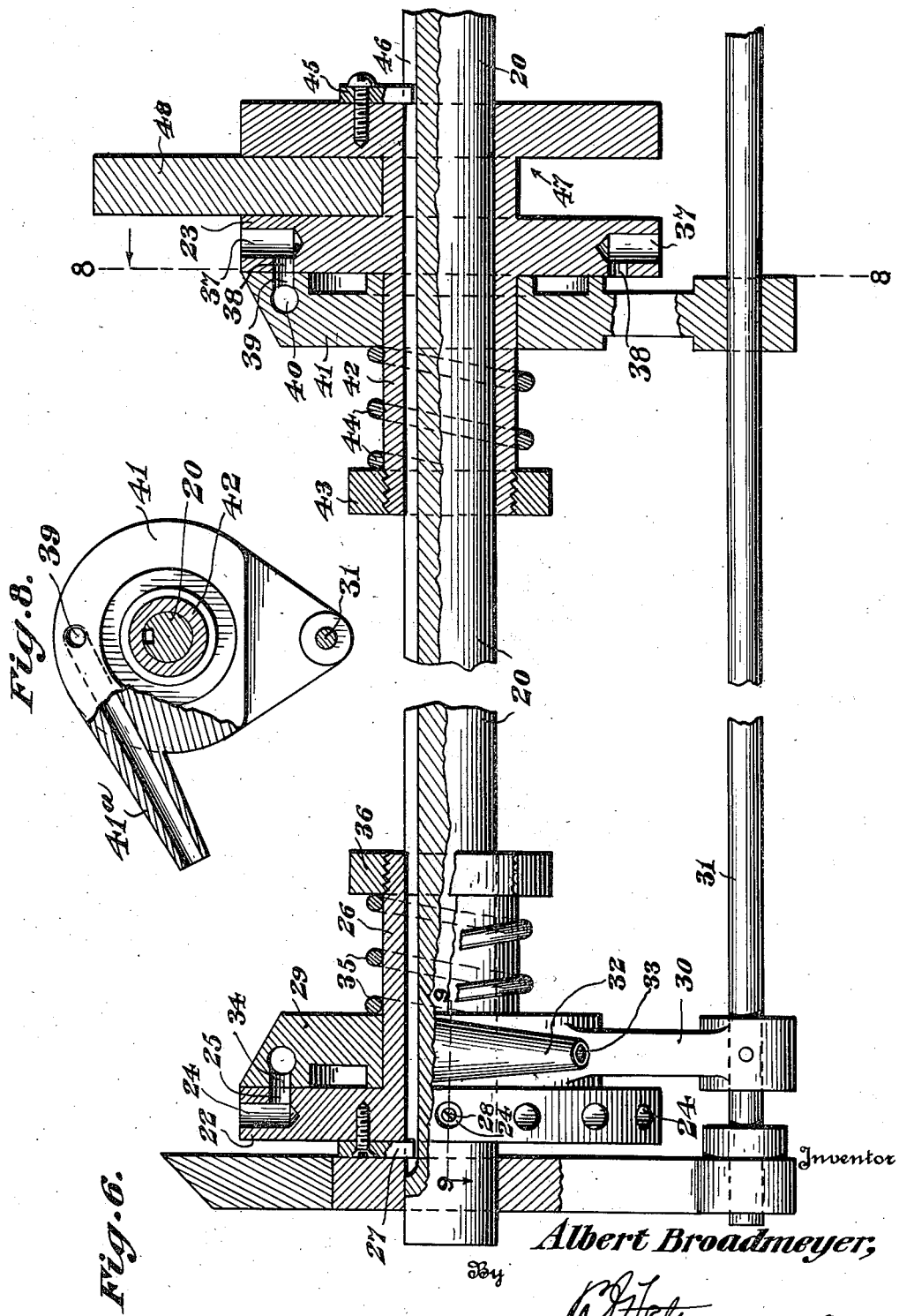

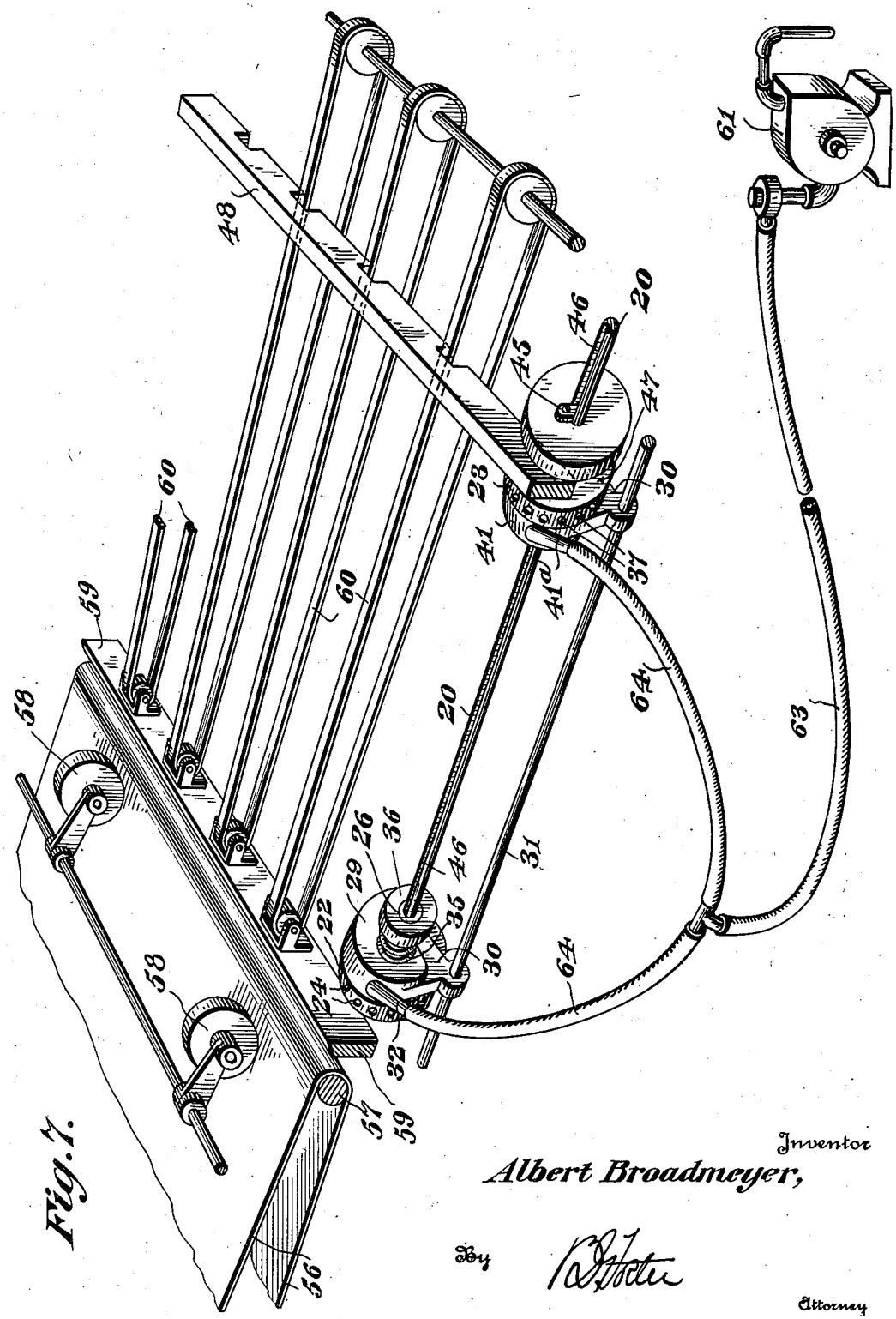

2,052,526

UNITED STATES PATENT OFFICE 2,052,526

SHEET FEEDING OR TRANSFERRING APPARATUS

Albert Broadmeyer, Harrisburg, Pa., assignor to W. O. Hickok Manufacturing Company, Harrisburg, Pa., a corporation of Pennsylvania Application September 26, 1931, Serial No. 565,390

22 Claims. (Cl. 271—45)

In that class of ruling machines in which two sections or ruling mechanisms are employed for successively ruling sheets at right angles and at one feeding, it has heretofore been thought necessary to maintain a timed relation between the two ruling mechanisms and the means for transferring the sheets ruled by the first mechanism to the second mechanism.

Applicant has, however, devised apparatus in which such timed or synchronous operation of the transferring mechanism is unnecessary and one of the primary objects of the present invention is the provision of practical means for this purpose. At the same time the invention is not restricted to transfer mechanism in L-type ruling machines, but may be employed in other capacities in which sheets are successively fed to an apparatus that operates on such sheets.

In one aspect therefore even in an L-type ruling machine, the mechanism may be said to constitute a feeder in that it feeds the sheets to the second machine.

A further and important object is to provide mechanism that is very simple in its character and eliminates the necessity of controlling valves and the like, in that the operation of the feeding means is controlled directly by the sheets themselves cooperating with said feeding means.

An embodiment of the invention that is at present considered the preferable one is illustrated in the accompanying drawings, wherein:—

Figure 1 is a plan view of an L-type ruling machine showing the invention as a transfer mechanism or as a feeder for the second machine.

Figure 2 is a sectional view taken substantially on the line 2—2 of Figure 1 and illustrating the second machine in elevation.

Figures 3 and 4 are detail sectional views on an enlarged scale and taken substantially on the lines 3—3 and 4—4 of Figure 1.

Figure 5 is a longitudinal sectional view on the line 5—5 of Figure 4.

Figure 6 is a sectional view on the line 6—6 of Figure 4 and on an enlarged scale.

Figure 7 is a detail perspective view of the transfer mechanism and associated conveyor means.

Figures 8 and 9 are detail sectional views respectively on the lines 8—8 and 9—9 of Figure 6.

Inasmuch as the invention herein involved relates more particularly to the transfer mechanism or the feeding means to the second machine, and inasmuch as the general structure of ruling machines is well known, only sufficient portions thereof have been illustrated to indicate the relation of the invention in the example illustrated. A first ruling machine is shown at 10 and includes the usual pen beam 11 operated by cams 12 with a gate 13 in advance of the pen beams. A conveyor cloth 14 serves to carry the sheets to be ruled to the gate 13, and when allowed by the operation of the gate these sheets pass under the pens of the pen beams 11 and are carried to a point in the lower portion of the first machine, and thence rearwardly into a corner 15. From this corner, they are delivered to a conveyor mechanism 16 at right angles to their path of travel through the machine 10, and by this conveyor, are delivered to a second machine 17 having pen beams 18, and when desired a gate 19 that controls the passage of the sheets to the pen beams 18.

In the present disclosure the invention relates to the means for transferring or starting the sheets from the corner 15 to the conveyor 16, or in other words, the mechanism constitutes means for feeding the sheets out of the corner 15 to the conveyor 16.

As shown, a shaft 20 is located longitudinally in the right hand side of the corner 15 and is driven by any suitable means, indicated at 21 in Figure 1. On this shaft are two suction rollers, designated respectively 22 and 23. The roller 22, it will be noted, is located directly adjacent to the end of the first machine 10 and consists of a disk having a series of peripheral suction orifices 24. Each of these orifices has a lateral port 25 opening through the side of the disk.

The disk 22 has a rearwardly extending hub 26 and is keyed to the shaft, as shown at 27, so that the disk and hub rotates with the shaft. While it may be adjusted lengthwise of the shaft, it is ordinarily fixed thereto and for this purpose a set screw 28 threaded through the bottom of one of the orifices 24, engages the shaft. The hub 26 rotates in a fixed head 29 arranged alongside the roller 22, said hub being held against rotation by an arm 30 extending therefrom and engaged with a rod 31 located longitudinally of the shaft 20 and beneath the same. This head 29 has a nipple 32 provided with a passageway 33 leading to a port 34 that opens through the side of the head adjacent the roller 22 and in a position to register successively with the ports 25 of the roller as said roller is rotated and as the ports come to their uppermost positions (see Figure 6). The head and roller are held in substantially air-tight engagement by means of a coiled spring 35 that is mounted on the projecting portion of the hub, abutting the head 29 and also abutting a nut 36 on the free end of the hub.

The suction roller 23 is of substantially the same structure as the roller 22, except that the parts are reversed. That is to say, said roller 23 is in the form of a disk having peripheral suction orifices 37 provided with lateral ports 38 arranged to successively register with a suction port 39 in a passageway 40 formed in a head 41 corresponding to the head 29. The passageway 40 opens through a nipple 41a projecting from the head. The roller 23 also has a hub 42 on which is an abutment nut 43, and a coiled spring 44 interposed between the nut 43 and the head serves to yieldingly hold the head 41 and roller 23 tightly enough to prevent any material leakage through the joint and into the port 39. The roller 23 with its head is, however, longitudinally adjustable along the shaft 20, but is feathered thereto, as shown by the key 45 slidable in a keyway 46 in the shaft 20.

The roller 23 furthermore is provided with an annular groove 47 engaged by an adjustable stop bar 48 that extends across the corner in the path of the sheets entering the same, as will be clear by reference to Figure 1. The bar 48, as illustrated in Figures 4 and 5 is mounted on brackets 49 slidable on track bars 50 that extend longitudinally of the shaft 20 and are suitably secured, as illustrated at 51 to the frame of the machine. The brackets 49 are in turn connected to endless sprocket chains 52 that pass around sprocket wheels 53 on shafts 54. One of these shafts is provided with a hand wheel 55. When this wheel is turned, it will be evident that the brackets 49 will be moved along the bars 50 and the stop bar 48 carried with them. This in turn will move the suction roller 23 along the shaft 20 and toward or from the suction roller 22.

The sheets that come from the first machine 10, as usual, are brought by a conveyor cloth 56 which passes around a roller 57 and cooperating with this roller and cloth are idler rollers 58 at the delivery end of the conveyor cloth 56. It will be noted particularly by reference to Figure 3 that the upper stretch or carrier stretch of the cloth 56 is at a considerable height above the adjacent suction roller 22 and preferably a cross bar 59 is placed in advance of said roller 22 and behind the roller 57, the same acting as a guide for the rear ends of the sheets delivered. At a lower level and extending longitudinally in the corner, or in other words, longitudinally of the path of the sheets entering the conveyor 56 are suitable carrier tapes 60, the upper stretches of which pass beneath the cross bar 48, which bar may be notched as shown in Figure 4, to allow their free passage and yet be in the path of the sheets transported by them.

Referring now particularly to Figures 1 and 7, it will be noted that suction creating means in the form of a pump 61 is employed suitably driven from a motor 62. The suction side of this pump is connected by a conduit 63 and branches 64 directly with the nipples 32 and 41a of the suction heads 29 and 41. It will be noted that there is no valve in this conduit and that not only is the pump in free open communication with both suction rollers, but that each suction roller is in effect in communication with the other. As a consequence when the pump is in operation air is constantly being drawn through the topmost suction orifices 24 and 37 of the two suction rollers 22 and 23.

The operation of the structure is as follows:

Sheets ruled on the first machine 10 are eventually delivered by the rear end of the conveyor cloth 56 on to the tapes 60 in the corner 15. Because of the elevation of the conveyor cloth 56 and as will be clear by reference to Figure 3, the advance end of each sheet passes over the first suction roller 22 at some distance above it, but as said advance end of the sheet strikes the stop bar 48, it will engage the second suction roller 23 over the topmost orifice 37 that is in communication through the ports 38 and 39 with the passageway 40, and consequently with the suction pump but as long as the corresponding orifice 24 of the other suction roller 22 is uncovered, no material amount of vacuum is created in the orifice 37 and no feeding action takes place. When the rear end of the sheet, however, leaves the conveyor cloth 56, it will drop behind the guide plate 59 as indicated in Figure 3 and will then close the active orifice 24 of the suction roller 22. Both relief vents to the pump being thus closed, vacuum will now be created in both suction rollers and both become active to carry off the sheet at right angles to its path of introduction to the corner so that the sheet is now fed to the toboggan 16 and thence into the second machine 17, where it is ruled at right angles.

This mechanism, it will be observed is an exceedingly simple one and eliminates the necessity of sychronous operation of the two machines or any invariable timed relation on the part of the transfer mechanism with respect to either machine. In other words driving the first and second machine and the transfer mechanism in synchronous or timed relation is unnecessary. This is because the operation of the transfer mechanism is not dependent on anything but the sheet itself and it does not become operative until the sheet is in proper position to be transferred. In this connection it will be noted that each feeding roller constitutes a check or control upon the other, for unless a sheet is positioned so as to engage and close the active suction orifices of both rollers, neither roller is operative. By having the roller 23 and the stop bar adjustable toward and from the other roller, sheets of various sizes can be operated on. More than that, it will be noted that periodic operation of the suction feeder by a valve is entirely eliminated, thereby reducing not only the mechanism and the cost, but eliminating the necessity of securing any timed relation or operation of the rollers.

While the invention has been shown as a transfer mechanism in an L-type ruling machine, it will be evident that it has all the functions of a feeder and may be employed in other relations and for other purposes, particularly where the sheets are delivered successively to it to be transmitted to another sheet operating instrumentality.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. In apparatus of the character set forth, the combination with a plurality of sheet moving devices, of means for causing one to be inactive unless the other is active, and means for causing a sheet to engage the moving devices in succession and be moved by both simultaneously.

2. In apparatus of the character set forth, the combination with a plurality of sheet moving devices, of means for causing each to be inactive unless the other is active, and means for causing a sheet to engage the moving devices in succession and be moved by both simultaneously.

3. In apparatus of the character set forth, the combination with a plurality of sheet moving devices that are normally inactive to move sheets, of means for causing one of said devices to control the operation of the other, and means for causing a sheet to engage one and leave it inactive and thereafter engage the other and permit both to become active and jointly operate on the sheet to move it.

4. In apparatus of the character set forth, the combination with a plurality of suction sheet moving devices, of a suction creating means having freely communicating branch connections with the respective sheet moving devices, each of said devices having sufficient postage area that when one is open to atmosphere, it will produce a relief vent to prevent feeding suction in the other, and means for passing a sheet across one and into contact with the other while contacting with the first to close the vents of both simultaneously, permitting them to act on the sheet and move it.

5. In apparatus of the character set forth, the combination with a plurality of suction sheet moving devices, of a suction creating means common to both of said devices and having continuously open communication therewith, each device having sufficient open communication with atmosphere so that either when unobstructed will constitute a vent to the suction creating means and will prevent a feeding suction in the other, and means for delivering sheets successively to a position to be acted upon by the suction creating means, by passing each sheet successively to the devices and thereby maintaining both inactive until both are simultaneously contacted.

6. In apparatus of the character set forth, the combination with a plurality of suction sheet moving devices, of a suction creating means common to both of said devices and having open communication therewith so that either when unobstructed, will constitute a vent to the suction creating means and will prevent a feeding suction in the other, and means for delivering a sheet first over one then over the other of the suction devices and holding it out of coaction with the first until the sheet is in coaction with the second.

7. In apparatus of the character set forth, the combination with a shaft, of a plurality of suction rollers journaled on the shaft, a suction creating means connected to the suction rollers and either roller forming a vent to prevent feeding vacuum in the other, and means for feeding sheets successively in a direction longitudinally of the shaft to cause each sheet to contact with and be fed by both rollers.

8. In apparatus of the character set forth, the combination with a shaft, of a plurality of suction rollers journaled on the shaft, a suction creating means connected to the suction rollers and either roller forming a vent to prevent feeding vacuum in the other, and means for feeding sheets successively in a direction longitudinally of the shaft to cause each sheet to pass over one roller in spaced relation thereto and then over and in contact with the other roller and permitting the rear end of the sheet to thereafter drop into contact with the first roller.

9. In apparatus of the character set forth, the combination with a shaft, of a plurality of suction rollers journaled on the shaft, a suction creating means connected to the suction rollers and each roller forming a vent to prevent feeding vacuum in the other, and a conveyor operating to carry sheets longitudinally of the shaft and having a delivery end higher than the first roller to pass the advance ends of the sheets over and in spaced relation to said first roller and advance it toward and in contact with the second roller, said conveyor allowing the rear ends of the sheets to drop upon the first roller and thereby by closing both rollers, to cause vacuum therein and movement of the sheets transversely to their initial path of movement.

10. In apparatus of the character set forth, the combination with a plurality of sheet feeding devices, of means connecting the devices for preventing the operation of one independently of the other, and means for delivering sheets in succession and causing each sheet to cooperate successively and then simultaneously with both feeding devices to prevent its feeding movement by one and thereafter effect its feeding movement by both.

11. In apparatus of the character set forth, the combination with a plurality of sheet feeding devices relatively movable toward and from each other, of means connecting the devices for preventing the operation of one independently of the other and securing their joint operation in feeding a sheet, means for delivering sheets successively to said feeding devices, and a stop for the sheets adjustable with one of the devices.

12. In apparatus of the character set forth, the combination with a shaft, and a plurality of suction rollers mounted thereon to rotate therewith, of suction creating means having communications with both rollers so that either when unobstructed, constitute a relief vent for the pump, one of the rollers being adjustable toward and from the other, a stop for the sheets adjustable with the adjustable roller, and means for feeding sheets successively so that each sheet is brought against the stop and into cooperative relation with both rollers.

13. In apparatus of the character set forth, the combination with a shaft and a plurality of suction rollers mounted thereon to rotate therewith, of suction creating means having connections with both rollers so that either when unobstructed, constitute a relief vent for the pump, one of the rollers being adjustable toward and from the other, a stop bar for the sheets engaging the adjustable roller, means for adjusting the bar and the roller, and a conveyor that delivers sheets successively in a direction longitudinally of the shaft and bringing each sheet against the stop and into coaction with both rollers, and said rollers acting jointly by suction on each sheet to move it transversely to the path of the conveyor.

14. The combination with a plurality of sheet moving devices that cooperate to move a sheet, of means for causing a sheet to be associated successively with the moving devices and in simultaneous association with all, and means for causing the moving devices to act upon the sheet when it is thus simultaneously associated with the said devices.

15. The combination with a plurality of sheet moving suction devices, of means for presenting a sheet to the devices in succession and causing it to be simultaneously associated with all, and means for causing suction created in said devices to cause them to coact in moving the sheet so presented.

16. The combination with rotatable suction devices, of means for delivering a sheet over the suction devices in succession and longitudinally of their axes of rotation and stopping it when simultaneously associated with all, and means for creating suction in said devices to cause them to simultaneously act on the sheet when said sheet is simultaneously over said suction devices.

17. In sheet feeding mechanism, the combination with a plurality of sheet moving devices, of means controlled by the presence of a sheet for causing one of the devices to be inactive unless the other is active, and means for moving sheets successively in an edgewise direction to a position to control the devices and be acted upon by the same when in controlling position.

18. In sheet feeding mechanism, the combination with a plurality of suction devices for moving sheets, of means for constantly creating suction in said devices, each device acting as a sufficient vent for the other to prevent the latter acting alone to move a sheet, and means for moving sheets successively in an edgewise direction to a position to close the vents of both devices and permit the building up of sufficient suction in both devices to cause them to cooperatively act in moving the sheet so positioned.

19. In sheet feeding mechanism, the combination with a plurality of sheet moving devices, of means for causing each to be inactive unless the other is active, and means for delivering successive sheets above said devices to a position to contact both, said sheets acting to cause both to be active and operate to move said sheets.

20. In sheet feeding mechanism, the combination with a plurality of rotatable suction rollers for moving sheets, of a suction creating means connected to the rollers for creating suction simultaneously in both, each roller constituting a vent to atmosphere for maintaining the other suction roller inactive, and means for delivering sheets successively above the rollers and to a position to close the vents of both to thereby create holding suction between the rollers and the sheets and cause the movement of the latter by the former.

21. In sheet feeding mechanism, the combination with a plurality of sheet moving devices, of means for causing each to be inactive unless the other is active, and means for delivering a sheet to the moving devices so that it will contact with them in succession and thereby maintain the first device inactive until the second device becomes active.

22. In sheet feeding mechanism, the combination with a plurality of rotatable suction rollers for moving sheets, of a suction creating means connected to the rollers for creating suction simultaneously in both, each roller constituting a vent to atmosphere for maintaining the other suction roller inactive, and means for delivering a sheet to cause it to contact with and close the vents of the rollers in succession, thereby maintaining one roller inactive until the other is active.

ALBERT BROADMEYER.